United States Patent Office 3,367,721
Patented Feb. 6, 1968

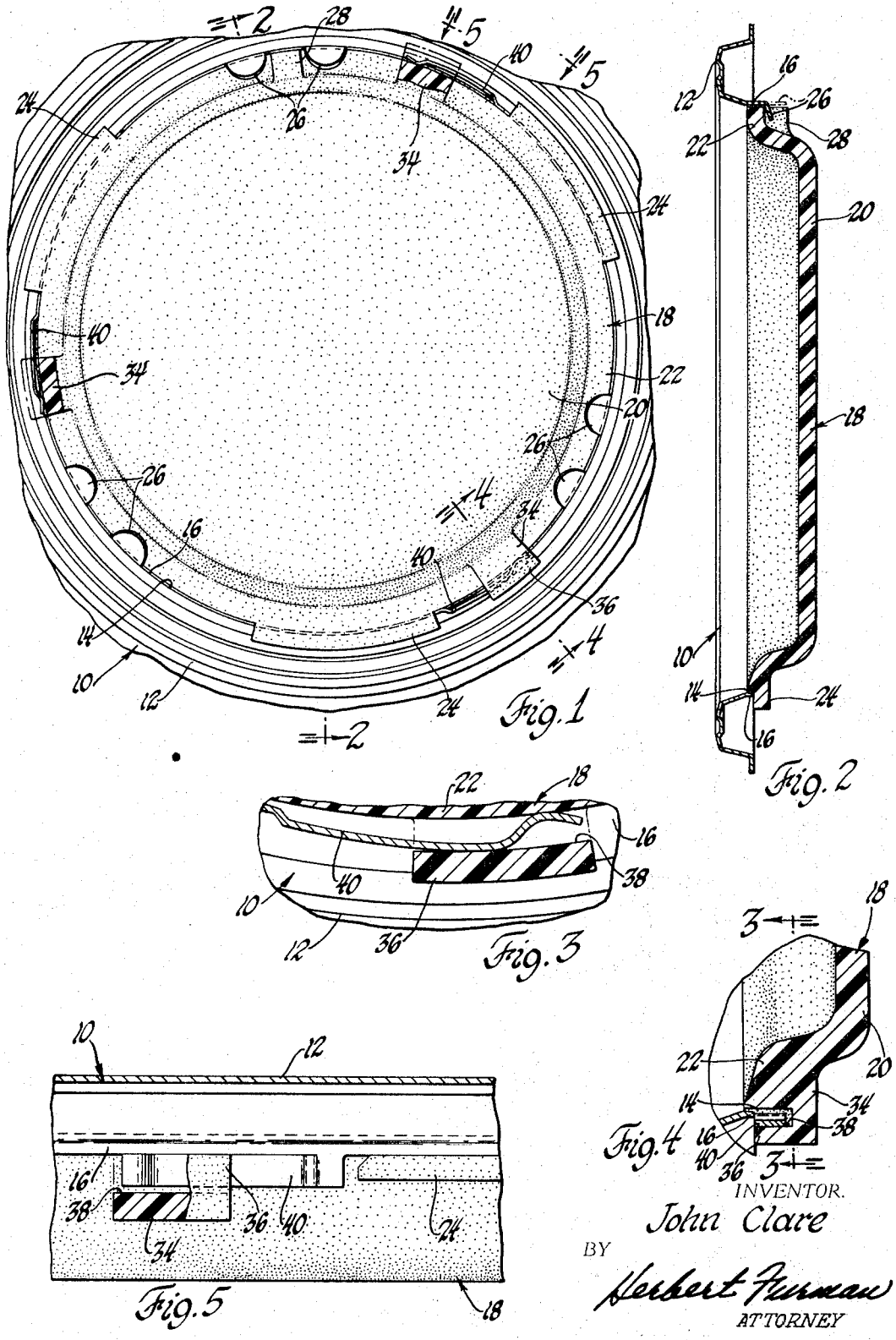

3,367,721
WHEEL COVER WITH CENTRAL MEDALLION
John Clare, Fraser, Mich., assignor to General Motors Corporation, Detroit, Mich., a corporation of Delaware
Filed Feb. 28, 1966, Ser. No. 530,651
4 Claims. (Cl. 301—37)

ABSTRACT OF THE DISCLOSURE

A wheel cover assembly comprises an annular formed metal outer cover member having an aperture therein which receives a formed plastic medallion member. The medallion includes extended peripheral flange segments which axially locate the medallion within the aperture in one direction, while the cover member includes a plurality of metal tabs adjacent the aperture which are deformable radially to position the medallion in the other axial direction. The medallion includes an axial projection located between two of the tabs to circumferentially position the medallion. The medallion also includes a plurality of axially and radially extended projections having open slots which wedgingly receive spring fingers struck out from the cover member adjacent the aperture to resiliently position the medallion radially within the aperture.

---

This invention relates generally to a wheel cover assembly and more specifically to improved means for positioning a decorative medallion within a wheel cover aperture.

One feature of this invention is the provision of resilient means for positioning a medallion centrally within a wheel cover aperture. Another feature is that the wheel cover includes a plurality of circumferentially spaced resilient means radially positioning the medallion within the aperture. Yet another feature is that the resilient means comprise spring fingers received within slots formed in circumferentially spaced radially extending segments of the medallion. Still another feature is that the spring fingers are formed from struck out portions of the cover flange defining the aperture.

Further features of this invention will become readily apparent upon inspection of the following detailed description of the attached drawings in which:

FIGURE 1 is an elevational view of a wheel cover assembly according to this invention;

FIGURE 2 is a sectional view taken generally on the plane indicated by line 2—2 of FIGURE 1;

FIGURE 3 is an enlarged sectional view taken generally on the plane indicated by line 3—3 of FIGURE 4;

FIGURE 4 is an enlarged sectional view taken generally on the line 4—4 of FIGURE 1; and FIGURE 5 is an enlarged detail view taken generally on the plane indicated by line 5—5 of FIGURE 1.

Referring now to FIGURES 1 and 2, a conventional wheel cover assembly 10 includes a formed metallic cover member 12 which includes conventional attachment means, not shown, for mounting the assembly to a vehicle wheel, not shown. Cover member 12 has a central annular aperture 14 defined by an axially extending flange 16. A decorative medallion 18, comprising a dished portion 20 and a peripheral flange 22, closes aperture 14. Medallion 18 and cover member 12 are provided with cooperating means for retaining and positioning the medallion within aperture 14.

As shown in FIGURES 1 and 2, flange 22 includes three circumferentially equally spaced arcuate segments 24 which overlie flange 16. Flange 16 is formed to include three circumferentially equally spaced pairs of projecting tabs 26 formed integrally therewith. As best seen in FIGURE 2, these tabs 26 are bent over flange 22 and coact with segments 24 to axially fix medallion 18 with respect to cover member 12. Medallion 18 further includes a raised projection 28 which is positioned between a pair of these tabs 26 to prevent rotation of medallion 18 with respect to cover member 12.

The aforedescribed segments 24, tabs 26 and projections 28 axially locate medallion 18 within aperture 14. Due to dimensional tolerances, a clearance exists between medallion 18 and flange 16. Thus, the medallion tends to move radially against flange 16 during wheel rotation, producing undesirable vibration and noise. To overcome this vibration, spaced resilient means are provided to radially position and suspend medallion 18 within aperture 14 to preclude radial contact with the flange 16.

As shown in FIGURE 1, medallion 18 includes three circumferentially equal spaced radial projections 34. As best seen in FIGURES 3 and 4, each projection 34 terminates in an axially extending segment 36 which forms an arcuate slot 38 with the periphery of flange 22. Each slot 38 wedgingly receives a portion of a spring finger 40 formed from a struck out portion of cover member flange 16. As shown in FIGURE 1, the spaced spring fingers 40 comprise a three-point suspension to radially position medallion 18 within aperture 14 and prevent vibration of the medallion against flange 16. Any number of the spring fingers 40 and the cooperating slots 38 and projections 34 could be utilized, although the arrangement shown and described above is preferred.

While only a preferred embodiment of this invention is shown and described modifications thereof are contemplated within the scope of this invention.

I claim:
1. A wheel cover assembly comprising a cover member having an aperture therein, a medallion member including a plurality of circumferentially spaced and radially closed slots at its peripheral edge, means for axially locating and securing the medallion member within the aperture, and a plurality of circumferentially extending spring arms carried by the cover member adjacent the aperture, each arm received within a slot and wedgingly contacting opposed surfaces thereof to resiliently position the medallion member radially within the aperture.

2. The wheel cover assembly recited in claim 1, wherein the medallion member includes a plurality of radially and axially extending portions each defining a slot with the peripheral surface of the medallion member.

3. The wheel cover assembly recited in claim 3, wherein the cover member includes a peripheral flange adjacent the aperture and each spring arm comprises a struck out portion of the flange.

4. The wheel cover assembly recited in claim 3, wherein the aperture is circular and the spring arms are circumferentially equally spaced therearound.

References Cited

UNITED STATES PATENTS

| 2,629,957 | 3/1953 | Lyon | 40—129 |
| 2,821,438 | 1/1958 | Lyon | 301—37 |
| 3,172,704 | 3/1965 | Wise | 301—37 |

FOREIGN PATENTS

| 550,186 | 12/1957 | Canada. |
| 1,229,438 | 3/1960 | France. |
| 617,913 | 2/1961 | Italy. |

RICHARD J. JOHNSON, Primary Examiner.

UNITED STATES PATENT OFFICE
CERTIFICATE OF CORRECTION

Patent No. 3,367,721                      February 6, 1968

John Clare

It is hereby certified that error appears in the above numbered patent requiring correction and that the said Letters Patent should read as corrected below.

Column 2, lines 8 and 9, for "projections" read -- projection --; line 18, for "equal" read -- equally --; line 49, for the claim reference numeral "3" read -- 2 --.

Signed and sealed this 15th day of April 1969.

(SEAL)
Attest:

Edward M. Fletcher, Jr.                      EDWARD J. BRENNER
Attesting Officer                            Commissioner of Patents